April 13, 1965   L. A. MOSCICKI   3,178,497
METHODS AND APPARATUS FOR INJECTION MOLDING
Filed Nov. 8, 1961   4 Sheets-Sheet 1
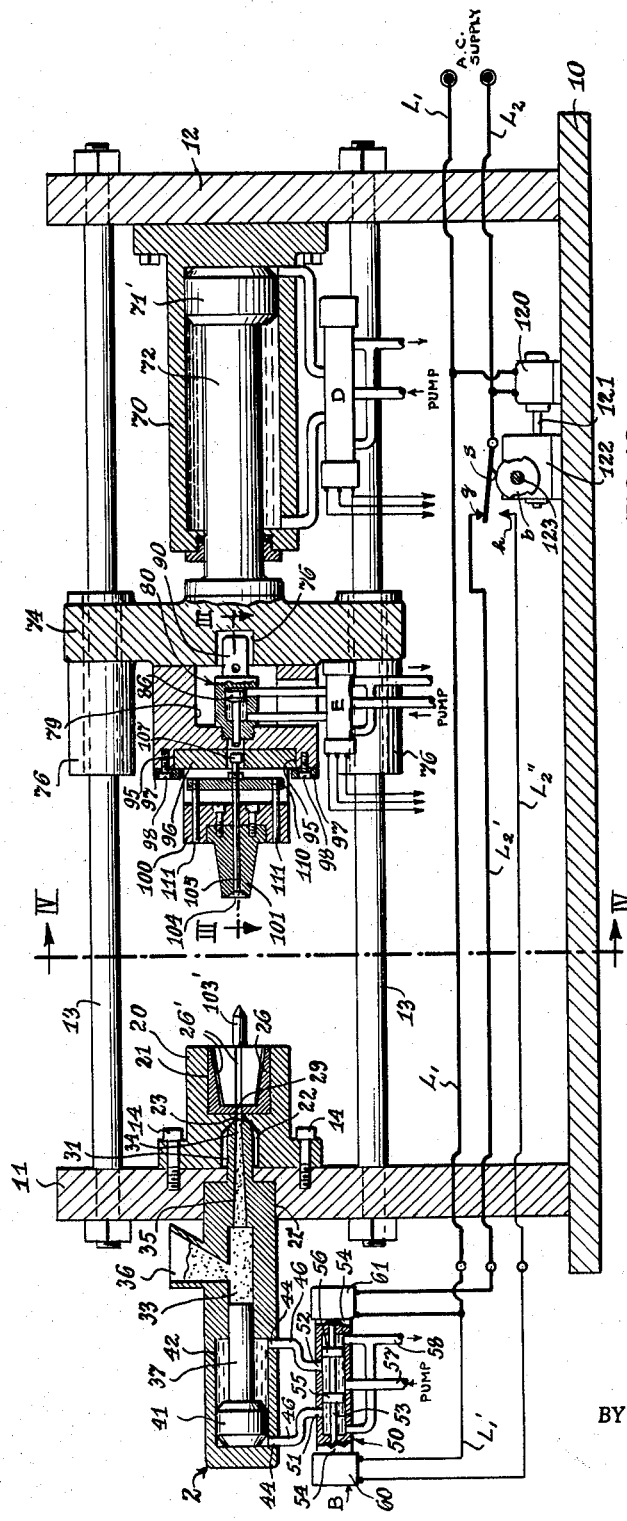
INVENTOR.
LEO A. MOSCICKI.
BY Angelo M. Pisarra
ATTORNEY.

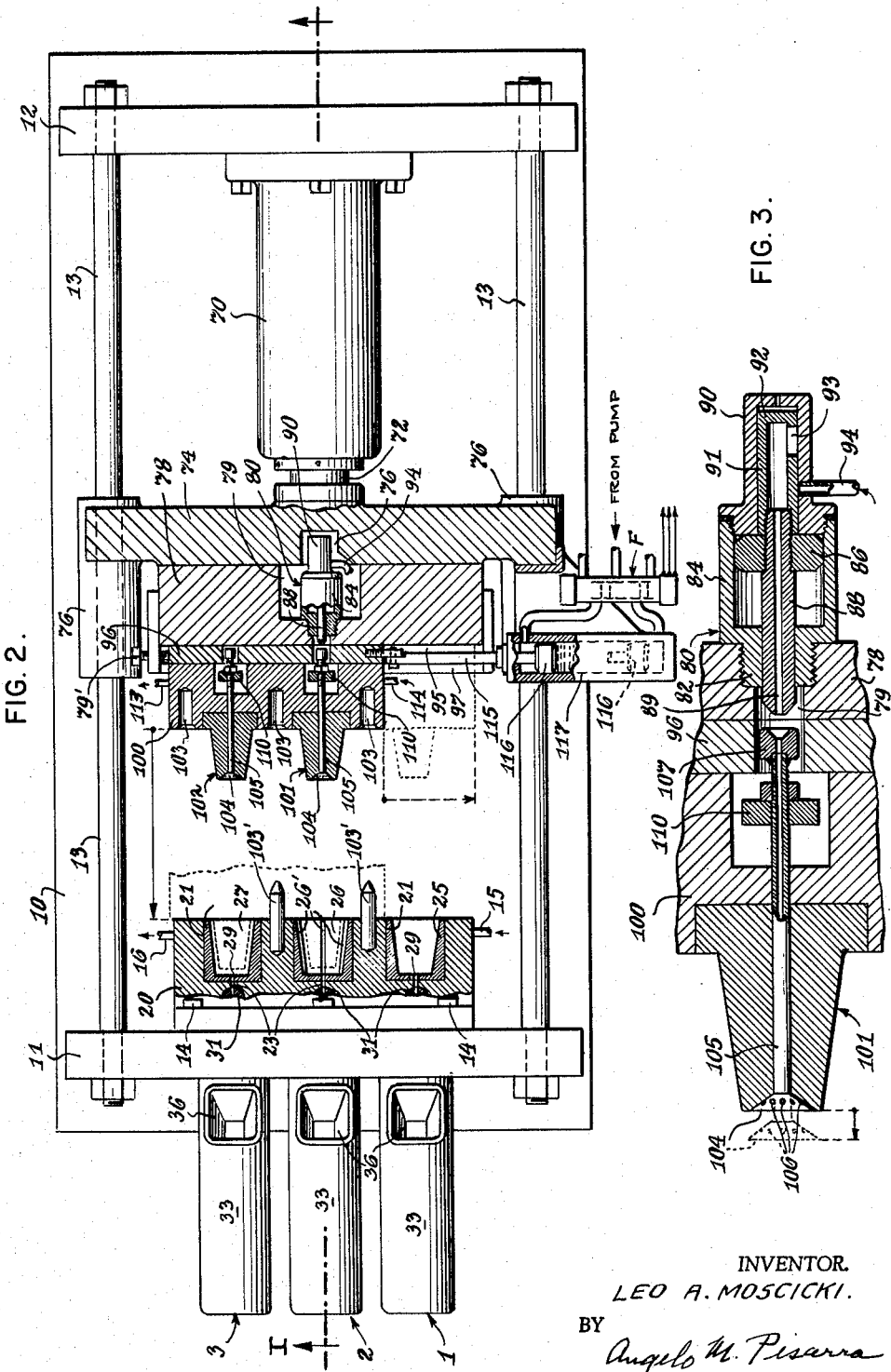

April 13, 1965     L. A. MOSCICKI     3,178,497
METHODS AND APPARATUS FOR INJECTION MOLDING
Filed Nov. 8, 1961     4 Sheets-Sheet 3
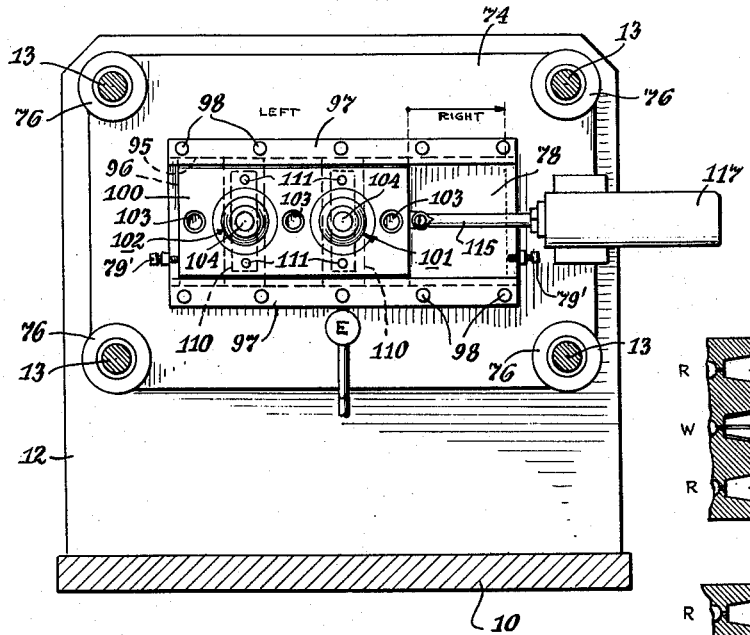
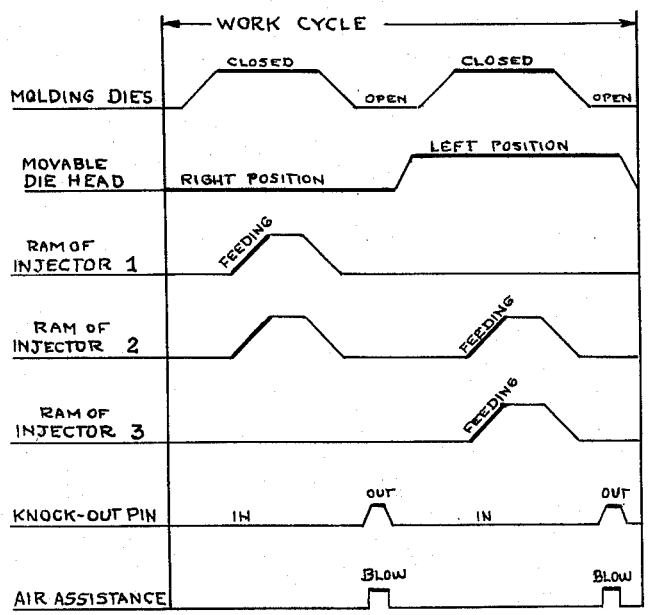
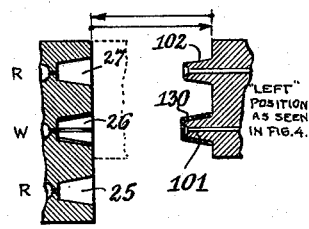
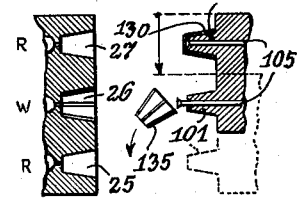
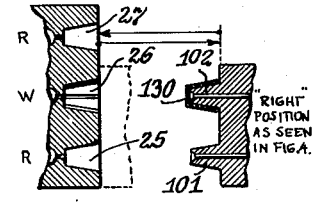
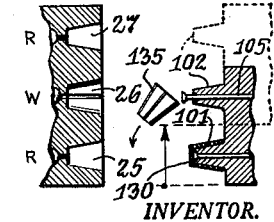
INVENTOR.
LEO A. MOSCICKI.
BY
Angelo M. Pisarra
ATTORNEY.

April 13, 1965   L. A. MOSCICKI   3,178,497
METHODS AND APPARATUS FOR INJECTION MOLDING
Filed Nov. 8, 1961   4 Sheets-Sheet 4

INVENTOR.
LEO. A. MOSCICKI.
BY
Angelo M. Pisarra
ATTORNEY.

United States Patent Office 3,178,497
Patented Apr. 13, 1965

3,178,497
METHODS AND APPARATUS FOR INJECTION
MOLDING
Leo A. Moscicki, 58 Gerdes Ave., Verona, N.J.
Filed Nov. 8, 1961, Ser. No. 151,010
12 Claims. (Cl. 264—245)

This invention is directed to novel methods, steps in the methods, apparatus and sub-combination thereof for the production of injection molded products or articles of manufacture.

The main object and purpose of this invention is to provide novel apparatus and methods for producing multi-stage injection molded products at reduced cost.

Another object of this invention is to provide a novel apparatus for the production of single or multi-color multi-stage injection molded products.

Another object of this invention is to provide novel methods for producing multi-stage injected molded products of single or multi-color and of the same and/or different sizes and/or configurations.

While the present invention finds application and use for the injection molding of articles of manufacture of either one or a plurality of different colors, it is of especial significance in the injection molding of articles of manufacture of different colors and consequently, the present description shall be concerned mainly with the application and use of the present invention for the injection molding of differently colored articles of manufacture.

FIG. 1 is a vertical cross sectional view of an embodiment of the novel apparatus of this invention taken on line I—I of FIG. 2 in the direction of the arrows.

FIG. 2 is a top plan view of FIG. 1 with certain parts shown in cross section.

FIG. 3 is a fragmentary view taken on line III—III of FIG. 1 in the direction of the arrows.

FIG. 4 is a cross sectional view taken on line IV—IV of FIG. 1 in the direction of the arrows.

FIG. 5 is a schematic view showing the various operations and time relation of operations during a complete work cycle of operation.

FIGS. 6–9 are fragmentary cross sectional diagrammatic views showing the relative positions of the individual stationary dies with respect to the individual movable dies at different stages of operation of the novel apparatus of this invention, and represent an illustrative embodiment of the novel methods of this invention.

FIG. 10 is a schematic showing of means, including electrical circuits associated with other elements of the apparatus for controlling the operation thereof.

FIGS. 11 and 12 are finished molded articles of manufacture illustrating two examples of injection molded products produced with the novel apparatus and employing the methods of this invention, with each of said molded articles shown in FIGS. 11 and 12 consisting of a plastic body portion to which are perfectly fused plastic strips or ribs of a color differing from the color of the body portion.

Figure 13:
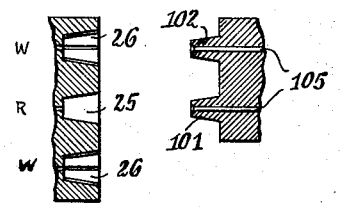
FIGS. 13–19 are schematic views of a modification of the method shown in FIGS. 6–9.
Figure 17:
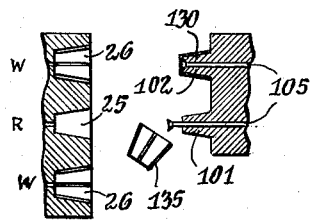
Figure 14:
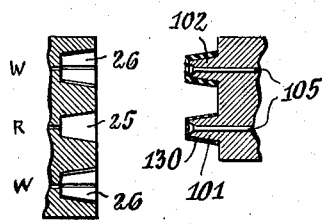

In the specific illustrative embodiment of the invention as shown in the drawings, the apparatus comprises a supporting base 10 which is horizontally disposed and is anchored to floor or other supporting structure in any convenient manner. Integral with or in any other manner secured to the base 10 are a pair of vertically extending supports 11 and 12 which are spaced from and are parallel to each other. A plurality of paralleled tension and supporting rods 13 extend between and are secured to said supports 11 and 12, and together with said supports 11 and 12 and said base 10 provide a rigid supporting frame.

Extending across the vertical support 11 and secured thereto by cap screws 14 is an abutment or stationary die-supporting head 20. The front of the die head 20 has a plurality, preferably at least three, and as shown three die accommodating recesses 21 spaced from each other along the length thereof, and the rear of the die head 20 has the same number of concave spherical nozzle accommodating recesses 22. The recesses 21 are in alignment with the respective recesses 22 and are in communication with the respective recesses 22 through narrow passageways or openings 23. Located in said recesses 21 and rigidly and fixedly secured to head 20 in a desired manner are female dies 25, 26 and 27. Said three dies 25, 26 and 27 are disposed in a single file, one next to the other in a straight line. One of said three dies differs in size and/or configuration from only one or both of the other two thereof. When a die is referred to as differing from another as used in the present description and claims, I obviously am referring to the working surface of the die differing from the working surface of another in either configuration and/or size. Obviously, the internal surface of a female die is its working surface and the external surface of a male die is its working surface. In one of the methods of operation for producing certain products, it is preferable that the internal size and configuration of the end dies 25 and 27 be substantially the same, and the internal configuration of the intermediate or middle die 26 between dies 25 and 27 be of different configuration for the reasons hereinafter set forth. Each of said dies has a narrow central passageway or opening 29 in registry and alignment with one of said opening or passageway 23 in head 20. The die-support 20 has conventional inlet opening 15 and outlet opening 16 communicating with a water circulating passageway, not shown, in support 20 for the passage of water therethrough to cool or chill said dies.

Fixedly secured to said vertical support 11 in any convenient manner are three substantially conventional injection units 1, 2, and 3 for injecting thermoplastic resin in the injectable heated state out of the discharge nozzles 31 thereof. Each injection unit has a chamber or cylinder 33 in communication with an opening 34 through the nozzle 31 thereof by fluid passageway 35.

Each cylinder 33 has a hopper 36 in communication therewith and through which may be supplied and fed into the cylinder 33 measured quantities of thermoplastic resin in the powdered or granular form. The cylinder 33 and nozzle 31 are heated by electrical resistance elements not shown and well known to the art, to convert and maintain the resin fed into the cylinder 31 in the heated state suitable for injection into a mold cavity.

A reciprocable piston or ram 37 is located in said cylinder 33 for injecting resin in the heated state through and out of the nozzle 31.

Each of said injection units also includes an individual actuator for reciprocating said piston or ram 37 thereof. The actuator is a reciprocable piston 41 slideably mounted in cylinder 42 and rigidly secured to that end of the piston or ram 37 outside of the cylinder 33.

Said three injection units 1, 2 and 3 have like control mechanisms A, B and C respectively connected thereto and only one of them, namely B, shall be described in detail. Cylinder 42 has oppositely disposed fluid inlet-outlet ports 44 connected to its control B by way of conduits 46 with first and second motor ports 51 and 52 respectively of a solenoid actuating reversing valve 50. The valve 50 is a cylinder having a reciprocable rod 53 extending through the ends 54 thereof. Fixedly carried by the rod 53 is a pair of spool type valve members 55 and 56 which are movable to establish selectively communication between either of the motor ports 51 and 52 and a pressure inlet port 57, while connecting the opposite motor port with an exhaust port 58 disposed at opposite ends of the valve chamber or cylinder. Connected to port 57 is a pump or other device (not shown) for constantly supplying fluid under pressure thereto. A solenoid 60 is located outside of and at one end of valve 50 and its armature is connected to one end of rod 53; and a solenoid 61 is located outside of and at the other end of valve 50 and its armature is connected to the other end of rod 53. Upon energization of solenoid 61 the rod 53 carrying spools 55 and 56 moves to the right hand position thus establishing communication between the pump (not shown), the fluid pressure 57 of the valve 50 and the motor port 52 communicating with cylinder 33 whereby the piston 41 and ram 37 are retracted to and maintained in their extreme retracted positions as shown in FIG. 1. Upon deenergization of solenoid 61 and energization of solenoid 60, the rod 53 and spools 55 and 56 are moved leftwardly thereby to establish communication between the pump, pressure inlet port 57 of the valve 50 and the motor port 51 whereby the piston 41 and ram 37 are moved to their extreme right hand position. It is to be understood that the injectors with or without said controls in combination therewith are not per se my invention.

As shown in FIG. 1, each of the injectors 1, 2 and 3 has its discharge or nozzle end mounted in a recess 22 of support 11, with the nozzle 31 thereof extending through an opening therein and centrally disposed in a rear recess of the member 20. Each of the injectors is so disposed that the virtual longitudinal center-line through the cylinder 33, passageways 35 and 34 are in the same straight line with the center-line through the female die and opening 29 therein.

Mounted on one face of the support 12 is a clamping cylinder 70 having a reciprocable piston rod 72. Said cylinder 70 has inlet-outlet ports at the ends thereof connected to control assembly D which is of the same construction and operation as controls A, B and C. A piston head 71 is slideably mounted in cylinder 70 and is secured to that end of the rod 72 in the cylinder 70. To the other end of said piston rod 72 located outside of said cylinder 70 is secured a platen 74. Platen 74 extends across the space between the tension and supporting rods 13 and has a central recess 76 therein. The platen 74 has a plurality of bearings 76 through which extend the rods 13 so that said platen 74 is slideably supported thereon. Mounted on the platen 74 and fixedly secured thereto is a supporting plate or head 78 having a central opening 79 therein for accommodating an actuating device 80.

As shown in FIG. 3 the device 80 comprises a head 82 whose upper end extends into the upper part or reduced diameter part of opening 79 and is secured to support 78 by making threaded engagement therewith. The head 82 has a cylinder 84 in which is a piston 86. Said piston 86 is secured to a piston rod 88 having a narrow central opening 89 therethrough lengthwise thereof. The head 82 has a second but narrower cylinder 90 depending from said cylinder 84. Located in second cylinder 90 is a hollow tubular member 91 making an air-tight fit therein, and having a bottom closure 92. The upper end of the member 91 is rigidly connected to the lower end of the piston rod 88. The passageway 89 in rod 88 is in communication with the interior of the member 91. Member 91 has an opening 93 in the lower part thereof, and the cylinder 90 has a port connected to air hose 94 at the upper part therein, in communication with a source (not shown) of air under pressure.

The cylinder 84 has oppositely disposed inlet-outlet ports connected to actuator assembly or control E which is of the same construction and operation as controls A, B, C, and D hereinbefore described.

The front face of the support 78 is recessed to provide a smooth sliding surface and side rails 95. Mounted on said surface, bearing thereagainst and against the interior surfaces of the side rails 95 is a slideable supporting plate 96. A pair of retaining guide bars 97 extend along the outer surfaces of said rails, are secured to said rails by cap screws 98 and extend over the outer face of said plate 96 to retain the same in the recess of support 78 but without impairing its slideability therein.

Rigidly secured to said plate 96 is a die head or support 100 having a pair of recesses in the front face thereof for receiving dies 101 and 102 which in this particular illustration are male dies as shown. The base of the dies 101 and 102 are located in said recesses and are rigidly secured to plate 96. The front face of the die head has also three dowel bushings 103, for receiving a pair of dowels 103' carried by head 20 when they are in alignment with bushings 103. The configuration and/or size of the dies 101 and 102 may be the same or different, that is the external or working surfaces of said dies may be the same or different depending upon the end products desired.

In the embodiment of this invention shown in the drawings, the dies 101 and 102 are substantially identical. Each of said dies 101 and 102 has a dish recess in the main body thereof at the outer end thereof and located in said recess is a cap 104 therefor whose bottom surface makes a perfect seat in the recess. Hollow tubes 105 are respectively secured to the respective caps 104 and extend through the central openings in the dies 101 and 102. Each cap 104 has a plurality of perforations 106 in communication with the passageway in a tube 105. The lower ends of the tubes 105 extend through aligned openings in the head 100 and plate 96. Each tube 105 carries a hollow small head 107 at the end thereof. Secured to each tube 105 and movable therewith is a cross plate 110 having a pair of oppositely disposed rods 111 fixedly secured thereto and located in the openings in the dies 101 and 102. Said head 100 has flexible hose connected to the inlet and outlet ends 113 and 114 of a passageway therein for circulating of cooling water to chill or cool said dies 101 and 102. The plate 96 together with the other elements supported thereby form an assembly which is slideable back and forth on the support 78. Secured to each end of support 78 is a plate having an adjustable stop nut 79 carried thereby. A rod 115 secured to support 78 has one end thereof secured to plate 96 and its other end to a piston 116 located in a cylinder 117. The cylinder 117 has oppositely disposed inlet-outlet ports which are located at the ends thereof and are connected to a control F of the same construction and operation as said controls A, B, C, D and E.

While the various solenoids of the actuators, A, B, C, D and E may be energized and de-energized in the desired timing relationship in any convenient manner, for such purposes, there is provided the arrangement shown schematically and diagrammatically in FIG. 10.

Referring to FIG. 10 there is a constant or variable speed electric motor 120 mounted on the base 10. The motor 120 is preferably of constant speed and its drive shaft 121 is coupled with a gear reduction unit 122 having an elongated drive shaft 123 supported by bearings 124. Fixedly secured to said drive shaft 123 and driven thereby at constant speed are a plurality of and as shown six timing cams $a$, $b$, $c$, $d$, $e$, and $f$. Each of said cams is of particular contour or design whereby work cycle of FIG. 5 may be effected and repeated over and over again. The electric motor 120 is connected to an A.C. source of electric supply by conductors $L_1$ and $L_2$. The conductor $L_1$ is also connected to one end of each of the windings of the solenoids 60 and 61 of the assemblies or controls A–E; and the conductor $L_2$ is connected to one end of each of the respective switches $s$ respectively actuated by the cams $a$–$f$. A conductor $L_{2'}$ is connected to the other end of the winding 61 and to a contact $g$; and conductor $L_{2''}$ is connected to the other end of the winding 60 and to a contact $h$. All of the circuits shown in FIG. 10 are identical with that shown in FIG. 1 except that the position of the switch s in a particular circuit may be different than that shown in FIG. 1, depending upon the particular cam associated therewith and the particular design thereof. The cams a–f are so designed that the respective switches s are controlled thereby during rotation thereof to make and break circuits of controls A–F thereby to control the operation of controls A–F whereby the single work cycle as shown in FIG. 5 is achieved, and continuously repeated in exactly the same sequence and timing of steps as shown in FIG. 5.

The novel apparatus of this invention may be operated as follows to provide different methods for producing various products.

In the embodiment shown FIGS. 1 and 6–9 of the drawings, end dies 25 and 27 are substantially identical and the middle die 26 is the same as dies 25 and 27 except that it has a number of recesses 26'; and the dies 101 and 102 are identical with each other.

With the parts of the apparatus disposed in the relative positions, shown in full lines in FIGS. 2 and 6, die 101 is in alignment with die 26 and die 102 is in alignment with die 27. The cylinder 33 and hopper 36 of end injectors 1 and 3 are loaded with red color granules or particles of thermoplastic material such as polyethylene for example; and the cylinder 33 and hopper 36 of the middle injector 2 are loaded with white color granules or particles of thermoplastic material, namely polyethylene. With all of the pressure devices, and heating devices in operation and with the cooling water turned on, main switch 200 is closed to electrically connect lines $L_1$ and $L_2$ to an A.C. source of electric supply whereupon the timing cams a–f are driven at constant speed and certain of the solenoid circuits shown in FIG. 10 are made. An illustrative arrangement for breaking and making solenoid circuits of an individual control A–F is shown in FIG. 2.

At this stage the male dies 101 and 102 and female dies 25, 26 and 27 are in open position and like injection rams 37 are in the state of rest and so remain for a short period of time. At the end of that period, the position of the switch s controlled by cam d is changed whereupon a first solenoid circuit of control D is broken and the second solenoid circuit thereof is made whereupon the spool valves thereof are actuated whereupon fluid pressure is applied to the piston 71 to move the piston 71 and piston rod 72 together with the head 74 and elements, including male dies 101 and 102 carried thereby towards the female dies. At the end of that stage the male dies 101 and 102 which respectively have been inserted into female dies 26 and 27, are now in coupled or closed position to define two different mold cavities shown in FIG. 2. Said male and female dies are maintained in said closed position over the period of time as shown in FIG. 5. Only a short time after said male and female dies have been initially brought to closed position, the position of the switches s controlled by cams a and b respectively are changed whereby a solenoid circuit of each of the controls A and B is broken and another solenoid circuit of each of the controls A and B is made whereupon the spool valves of controls A and B are actuated whereupon fluid pressure is applied to pistons 41 of injectors 2 and 3 thereby to drive the rams 37 thereof thereby to cause the injection of the polyethylene in cylinders 33, heated by the heaters not shown, through their respective nozzles and into said mold cavities, with the heated red polyethylene being injected from injector 3 into the mold cavity defined by the dies 27 and 102 and with the heated white polyethylene being injected from injector 2 into the mold cavity defined by dies 26 and 101. The rams 37 reach their maximum injection positions and are maintained in that position for period thereafter as shown in FIG. 5. Then the position of the switches s controlled by cams a and b are again changed whereby the last mentioned circuits of controls A and B are broken and the first circuits thereof are remade whereupon the spool valves of controls A and B are actuated in the other direction whereupon fluid pressure is applied to the other side of pistons 41 of injectors 2 and 3, thereby to retract the rams 37 thereof, to their maximum retracted positions, as shown in FIG. 1. In the course of said retraction of said rams 37, the position of the switch s controlled by cam d is again actuated to break a solenoid circuit and to make the other solenoid circuit of control D whereupon the spool valves of control D are actuated in the other direction whereupon fluid pressure is applied to the other side of piston 71 thereby to retract piston 71 together with the head 74 and dies 101 and 102 coupled therewith to their original position as shown in full lines in FIGS. 1 and 2. Throughout said entire retraction step, the die 101 has coupled therewith a molded polyethylene element of white color in the substantially solid state in only this initial state and the other die 102 has coupled therewith a molded red element 130 in the substantially solid state, at elevated temperature and of the shape and design of the cavity previously defined by dies 27 and 102.

With said elements now in said retracted position, knock-out tube 105 associated with die 101 is in alignment with tube 88 and while in said position, the position of switch s controlled by cam e is changed to break a solenoid circuit and make solenoid circuit of control E whereupon the valves thereof are actuated whereupon fluid pressure is applied to piston 86 to drive tube 88 against tube 105, to force cup 104 against bottom of the white plastic element initially to separate at least a part thereof from said die 101 and to move support 110 and rods 111. When opening 93 reaches tube 94, air under pressure therefrom passes into element 91, and through the passageway in tubes 88 and 105 and then through perforations 106 to aid in separating and blow white plastic element off of die 101 thereby to completely remove it therefrom and may be discarded. At the end of said operation which lasts but a short period, the position of switch s controlled by cam e is again changed to break a solenoid circuit and make a solenoid circuit of controller E whereupon the valves thereof are actuated whereupon pressure is applied to piston 86 to retract it and tube 91 to their full line positions as shown in FIG. 3. Then the position of switch s controlled by cam f is changed thereby to break a solenoid circuit and to make the other solenoid circuit of controller F whereupon the spool valves thereof are actuated whereupon fluid pressure is exerted on the piston 116 to move said piston from full line to the dotted line position shown in FIG. 2 thereby to slide plate 96 together with bare die 101 and die 102 carrying molded element 130 to the position, as shown in FIG. 8, which will be used herein as the initial reference stage for carrying out repetitively the work cycle shown in FIG. 5, starting with FIG. 8, then to 9, 6 and 7 in that order back to FIG. 8. As shown in FIG. 8, where repetitive production begins, die 102 having said molded element 130 still at elevated temperature and coupled therewith, and being in alignment with die 26, and the bare die 101 is in alignment with die 25. Shortly thereafter, the position of switch s controlled by cam d is changed thereby to break the other solenoid circuit of control D and to remake its first solenoid circuit whereupon the valves of control D are actuated whereupon fluid pressure is applied to piston 71 to move it together with the head 74 and die 101 and die 102 together with element 130 at elevated temperature and coupled with die 102 towards dies 25 and 26 to locate said die 101 in die 25 and die 102 together with element 130 at elevated temperature and coupled therewith in die 26 and to close and couple said dies as shown diagrammatically in FIG. 8 thereby to provide a plurality of different mold cavities, with one consisting of die 26 and die 102 together with said molded element 130 at elevated temperature coupled thereto and the other consisting of die 25 and bare die 101. In the course of closing said dies, return pins 111 are pushed against head 20 whereby tube 105 and cup 104 of die 101 are returned to their original positions. While said dies are maintained in said closed position, the positions of switches s controlled by cams b and c are changed thereby to break the solenoid circuits and to remake the other solenoid circuits of controls B and C, whereby the valves thereof are actuated whereupon fluid pressure is applied to pistons 41 to drive the rams 37 of injectors 1 and 2 thereby to inject heated red polyethylene from injector 1 into the cavity defined by dies 25 and 101 and heated white polyethylene from injector 2 into the other cavity defined by die 26 and die 102 having said element 130 at elevated temperature coupled thereto, whereby said heated white polyethylene fills the unoccupied space in said cavity and therein fuses with element 130 is molded and becomes integrally coupled with element 130 as white strips or ribs 132. Then the position of switch s controlled by cam d is again actuated thereby and like before breaks and makes the solenoid circuits of control D whereby its valves are actuated whereupon fluid pressure is applied to piston 71 thereby to retract said piston 71 together with head 74 and dies 101 and 102 to open position. Throughout said entire retraction step and in this position the die 102 has coupled therewith the red molded element 130 to which have been fused strips or ribs 132 of white polyethylene to provide a multicolor product 135, an example of which is shown in FIG. 11; and die 101 has coupled thereto a red color molded polyethylene element 130 at elevated temperature and the same as that heretofore described.

With said elements now in said retracted position knock-out tube 105 associated with die 102 is in alignment with tube 88 and while in said position, the position of the switch s controlled by cam e is changed to break a solenoid circuit and make solenoid circuit of control E whereupon the valves thereof are actuated whereupon fluid pressure is applied to piston 86 to drive tube 88 against tube 105, to force cup 104 against the bottom of the white ribbed red product 135 and initially to separate at least a part thereof from said die 102 and to move support 110 and rods 111. When the opening 93 reaches tube 94, the air under pressure therefrom passes into element 91, and through the passageway in tubes 88 and 105 and then through perforations 106 to aid in separating said product 135 and blow it off of the die 102 thereby to completely remove it therefrom as shown in FIG. 9. At the end of said operation which lasts but a short period, the position of switch s controlled by cam e is again changed to break a solenoid circuit and make a solenoid circuit of controller E whereupon the valves thereof are actuated whereupon pressure is applied to piston 86 to retract it and tube 91 to their full line positions as shown in FIG. 3.

Then the position of the switch s controlled by cam f is again changed thereby to break a solenoid circuit and to make the other solenoid circuit of controller F whereupon the spool valves thereof are actuated whereupon fluid pressure is exerted on the piston 116 to move said piston from the dotted to the full line position shown in FIG. 2 thereby to slide plate 96 together with die 101 carrying element 130 and now bare die as shown in dotted lines in FIG. 9 and in full lines in FIG. 6. In this position, die 101 having molded element 130 still at elevated temperature and coupled therewith, is in alignment with die 26, and the die 102 which is bare is in alignment with die 27, and are in position shown in FIG. 6. Shortly thereafter, the position of switch s controlled by cam d is changed thereby to break a solenoid circuit of control D and to remake its other solenoid circuit whereupon the valves of control D are actuated whereupon fluid pressure is applied to piston 71 to move it together with the head 74 and die 102 and die 101 together with element 130 at elevated temperature coupled with die 101 towards dies 26 and 27 to locate said die 102 in die 27 and die 101 together with element 130 at elevated temperature and coupled therewith in die 26 and to close and couple said dies thereby to provide plurality of differing mold cavities, with one consisting of die 26 and die 101 together with said molded element 130 at elevated temperature coupled thereto and the other consisting of bare die 27 and die 102. In the course of closing said dies, the extended return pins 111 are forced against stationary head 20 thereby to return the tube 105 and cup portions 104 of the die 102 in their retracted positions, with element 104 being firmly seated in its recess. While said dies are maintained in said closed position, as shown in full and dotted lines in FIG. 6, the positions of switches s controlled by cams b and a are changed thereby to break the solenoid circuits and to remake the other solenoid circuits of controls B and A, whereby the valves thereof are actuated whereupon fluid pressure is applied to pistons 41 to drive the rams 37 of injectors 2 and 3 thereby to inject heated red polyethylene from injector 3 into the cavity defined by dies 27 and 102 and heated white polyethylene from injector 2 into the other cavity defined by die 26 and die 101 having said element 130 still at elevated temperature and coupled thereto thereby to fill said last cavity in which said injected heated white polyethylene is molded, fuses and becomes coupled as strips or ribs 132 with the red molded element carried by die 101 to provide again the product 135 shown in FIG. 11. Then the position of the switch s controlled by cam d is again actuated thereby and like before breaks and makes the solenoid circuits thereof whereby the valves of control D are actuated whereupon fluid pressure is now applied to a side of piston 71 thereof to retract said piston 71 together with head 74 and dies 101 and 102 to open position and to locate them in the position shown in FIG. 7. During said entire retraction step and in this position the die 101 has coupled therewith the red molded element 130 to which have been perfectly fused strips or ribs 132 of white polyethylene to provide a white-striped red product 135, an example of which is shown in FIG. 11 and the die 102 has coupled thereto a red color molded polyethylene element 130 at elevated temperature and the same as that heretofore described. With said elements in said retracted position as shown in FIG. 7, the knock-out hollow pin 105 associated with die 101 is in alignment with the tube 88 and while in said position, the position of the switch s controlled by cam e is changed to break a solenoid circuit and make a solenoid circuit of control E whereupon the valves thereof are actuated whereupon fluid pressure is applied to piston 86 to drive tube 88 against tube 105, to force cup 104 against the bottom of the product 135 and initially to at least separate at least a part thereof from said die 101 and to move support 110 and rods 111. When the opening 93 reaches tube 94, the air under pressure therefrom passes into element 91, and through the passageways in tube 88 and 105 and then through perforations 106 to aid in separating said product 135 and blow it off of the die 101 thereby to completely remove it therefrom, and leaving it bare as shown in FIG. 7. At the end of said operation which lasts but a short period, the position of switch s controlled by cam e is again changed to break a solenoid circuit and make a solenoid circuit of controller E whereupon the valves thereof are actuated whereupon pressure is applied to piston 86 to retract it and tube 91 to their full line positions as shown in FIG. 3.

Then the position of the switch s controlled by cam f is again changed thereby to break a solenoid circuit and to make the other solenoid circuit of controller F whereupon the spool valves thereof are actuated whereupon fluid pressure is exerted on the piston 116 to move said piston from the solid to the dotted line position shown in FIG. 2 thereby to slide plate 96 together with bare die 101 and die 102 carrying molded element 130 to the position shown in FIG. 8, the starting stage of repetitive reproduction, thereby to complete the first full work cycle (FIG. 5) of repetitive reproduction.

The work cycle as shown in FIG. 5 is repeated by the method before described whereby the apparatus of this invention may be continuously operated to produce continuously said white ribbed red molded products 135 shown in FIG. 11, with two products 135 being produced in each work cycle.

Instead of the middle die 26 having recesses 26' therein, it may be plain and instead of the dies 25 and 27 being plain, they may have ribs therein. By practicing the aforedescribed method with said so modified dies, there are produced in each repetitive work cycle as shown in FIG. 5 two products 135', an example of which is shown in FIG. 12, and consists of a red polyethylene element 130' having grooves in which are white strips 132' perfectly fused to element 130' with the outer surface of strips 132' being flush with the outer surface of element 130'.

Still another example of a modification of the apparatus is to substitute for dies 101 and 102 new male dies geometrically similar to and of appreciably smaller dimentions dies 101 and 102 and to substitute for female die 26, a female die 26, except that it has no recesses. With such modification, and employing my novel method heretofore described, repetitive work cycle shown in FIG. 5, there may be produced in each repetitive work cycle two products, with each consisting of a white interior shell of red polyethylene to which is perfectly fused an exterior shell of white polyethylene.

Also if desired in any of the embodiments of this invention, the color of the polyethylene in injector 1 may be different, from that in injector 3, as for example may be blue instead of red so that by following the method heretofore described there may be produced in a single repetitive work cycle shown in FIG. 5 two products, one being white on red and the other being white on blue, as for example when of the type shown in FIG. 11, the body 130 of one of them is red and of the other is blue, while the strips 132 of each product 135 is white.

Still another modification of the novel apparatus as shown and described is to replace the middle die 26 with die 25 or 27 and substitute die 26 for die 27 and another die 26 for die 25. When such a modification is employed for the production of product 135, the method for producing two products 135 in each repetitive cycle of operation as shown in FIG. 5 is only slightly modified and the polyethylene in injector 2 is red and that injectors 1 and 3 is white. Because of the modification of the method, a new combination of timing cams are substituted for the set a–f.

Figure 15:
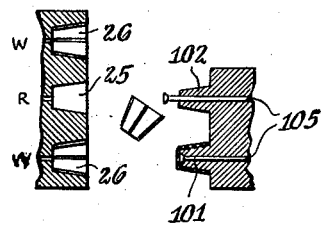

Such modification is shown diagrammatically in FIGS. 13–19. Said FIGS. 13–19 diagrammatically illustrate the method for producing two products 135 in each repetitive cycle shown therein. With the cam timing relationship modified in this modification the method is as follows:

The male and female dies are in open position and in the relationship as shown in FIG. 13. Control D now operates whereupon the male dies are moved to and maintained in closed position. While said dies are maintained in said closed position controls A and B now operate whereupon heated white polyethylene is injected into the mold cavity defined by first die 26 and die 102 and heated red polyethylene is injected into the mold cavity defined by dies 25 and 101. Then control D again operates whereby retraction of the piston 71 occurs to move it to its position as shown in FIG. 2 whereby the die 102 having molded white element coupled therewith and die 101 having molded red element 130 coupled therewith are retracted to the die-open position shown in FIG. 14. Control F now operates whereby slide plate 96 together with dies 101 and 102 having said molded elements coupled thereto are moved to the position shown in FIG. 15 thereby to locate die 102 in alignment with die 25 and die 101 in alignment with the other die 26. In this position as shown in FIG. 15 knock-out tube 105 associated with die 102 is in alignment with the actuator tube 88 and now control E operates whereby white molded element is separated from and blown off of die 102 and may be discarded, now leaving die 102 in the bare condition. At this stage, FIG. 15, from which the white element has been removed is the first step of a repetitive work cycle starting with FIG. 15, then going to FIG. 16, FIG. 17, FIG. 18, and FIG. 19 in that order.

Figure 18:
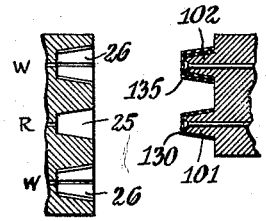
Figure 19:
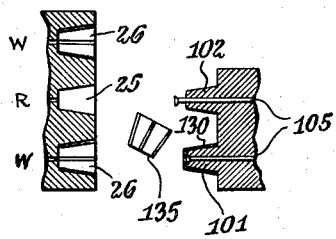
Figure 16:
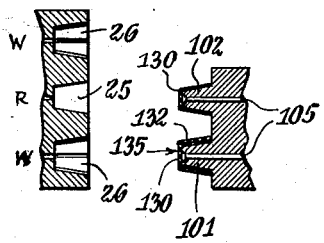

The movable dies together with element 130 coupled with die 101 are moved to the closed position, and are maintained in said closed position. In said closed position die 102 is located in die 25 and die 101 together with element 130 is located in die 26 thereby to provide two different mold cavities. While maintained in said closed position, controls B and C operate whereupon there is injected into the cavity formed by dies 25 and 102 heated red thermoplastic material from injector 2, and heated white thermoplastic material from injector 1 into the unoccupied space of the other mold cavity whereupon the heated white thermoplastic material comes into contact with the molded element 130 which is still at elevated temperature thereby to become perfectly fused therewith. Then control D now so operates that die 102 having element 130 coupled therewith and die 106 having element 130 to which are fused white stripes 132 thereon to provide product 135 are moved to the open position shown in FIG. 16. Control F now operates whereby slide plate 96 together with dies 101 and 102 having said element 130 and product 135 respectively carried thereby are now moved to the position shown in FIG. 17. In this position tube 105 associated with die 101 is in alignment with actuator tube 88. Control F now operates whereupon product 135 is separated and blown off of die 101, leaving die 101 bare. In said position bare die 101 is in alignment with die 25 and die 102 having 130 coupled therewith is in alignment with first die 26. Then control D so operates whereupon die 101 together with die 102 carrying element 130 are moved to closed position thereby to close said aligned dies. They are maintained in said closed position and while maintained in said closed position controls A and B so operate that heated red thermoplastic material is injected into the cavity formed by dies 25 and 101 and heated white thermoplastic material is injected into the unoccupied space of the other cavity wherein said heated white thermoplastic material injected therein fuses with element 130 still at elevated temperature and is molded in the form of stripes 132 to provide product 135 as shown in FIG. 18. Control F now operates whereby slide plate 96 together with dies 101 and 102 having said molded element coupled thereto are moved to the position shown in FIG. 19 thereby to locate die 102 in alignment with die 25 and die 101 in alignment with the other die 26. In this position as shown in FIG. 19, knockout tube 105 associated with die 102 is in alignment with the actuator tube 88 and now control E operates whereby the product 135 is separated from and blown off of die 102 now leaving die 102 in the bare condition. Thus to reestablish the condition and relative position of parts as shown in FIG. 15 after the red element thereof has been removed from die 102. The repetitive work cycle of this particular method is from FIG. 15–FIG. 19 as illustrated and hereinbefore described so that continuously and repeatedly two products 135 may be produced in each repetitive work cycle.

It is to be understood that the use of male and female dies in the embodiment of the invention shown in the drawing and herein described is only by way of illustration. In such a construction, due to the shrinkage of the polyethylene or other suitable thermoplastic injected into the mold cavity of said dies when closed as a result of the cooling thereof, said material shrinks away from the working surface of the female dies and shrinks fairly tightly around the male dies to become coupled thereto. However, if desired means, such as shallow recesses in the male dies may be employed for maintaining the molded material coupled to the movable die in the course of their retraction from the stationary die. Also instead of employing male dies 101 and 102, female dies may be substituted therefor. In addition, if the size of the products to be molded permits, each of said dies shown in the drawings herein may be replaced by a set of similar dies so that two separate sets of products may be produced in a single work cycle shown in FIG. 5 and heretofore described, with each set consisting of two or more products, with each product being of the same or multi-colored, as for example of the type shown in FIGS. 11 and 12 except that they are of smaller size.

Since certain changes may be made in carrying out the heretofore described process and modifications effected in the novel apparatus for practicing the principle thereof, without departing from the scope of the invention, it is intended that all matter contained in the above description or shown in the accompanying drawings, shall be interpreted as illustrative and not in a limiting sense.

It is also to be understood that the following claims are intended to cover all the generic and specific features of the invention herein described, and all statements of the scope of the invention, which as a matter of language might be said to fall therebetween.

I claim:

1. An injection molding apparatus comprising a first, a second and a third die, means for supporting said three dies in straight line relationship, said second die differing from said first and third dies, a first injection chamber in communication with said first die, a second injection chamber in communication with said second die, a third injection chamber in communication with said third die, a fourth and fifth die, means for supporting said fourth and fifth dies in straight line relationship, said second mentioned means together with said dies supported thereby being movable in one direction in a straight line path to locate said fourth die in alignment with said first die and said fifth die in alignment with said second die, in said position said movable means and dies supported thereby being movable in a second path transversely of said first mentioned path and towards said first mentioned means and said dies supported thereby to closed position to couple said aligned dies thereby to define a pair of mold cavities, one of said mold cavities differing from the other, said second mentioned means together with the dies supported thereby being movable in said second mentioned path and away from said first mentioned means to move said fourth and fifth dies to open position and then in a direction opposite to said first mentioned direction and in said first mentioned path to locate said fourth die in alignment with the said second die and said fifth die in alignment with said third die, in said last mentioned position said second mentioned means and dies supported thereby being movable towards said first means and said dies supported thereby to closed position to couple said last mentioned aligned dies thereby to define a pair of mold cavities, one of said last mentioned pair of mold cavities differing from the other 2. An injection molding apparatus comprising a first, second and third die in straight line relationship, a stationary support, said three dies supported by said support, a fourth and fifth dies in straight line relationship, a movable support, means for reciprocating in a straight line path said movable means and the dies supported thereby to locate said fourth and fifth dies in alignment with said first and second dies respectively and then said fourth and fifth dies in alignment with said second and third dies respectively and means for reciprocating said movable support and said dies supported thereby towards and away from said stationary support and said dies carried by said stationary support thereby to close and open said dies when said fourth and fifth dies are in alignment with said respective first and second dies and when said fourth and fifth dies are in alignment with said respective second and third dies, said second dies being disposed between said first and third dies and differing from both said first and third dies and means for injecting thermoplastic material into said dies when closed.

3. The method for injection molding multi-color products comprising
   (A) while a first die and a second die in straight line relationship are respectively in closed position with respect to a third die and a fourth die thereby to define a first pair of differing mold cavities, said third and fourth dies being in straight line relationship with respect to each other and to a fifth die, with said fourth die located between said third and fifth die, said first and second dies being movable and said third, fourth and fifth dies being stationary, and with a first molded thermoplastic member located in the cavity defined by said first die and said third die and partially filling the space thereof and corresponding substantially to a mold cavity defined by said first and fifth dies when in closed position, and the other cavity defined by said second and fourth dies, into said cavity in which said member is located injecting a heated thermoplastic material, which is of a different color from said member, to fill the unoccupied space thereof and into contact with said member to become coupled with said member and to be molded therein to provide a multi-color molded unitary product, injecting a heated thermoplastic material into said other of said pair of mold cavities for molding said material into a second molded member;
   (B) from said stationary dies moving in a straight line path to open position an assembly comprising said first and second dies, together with said second member coupled with said second die and said product coupled with said first die;
   (C) removing said product from said first die;
   (D) moving in a straight line path transversely of said first mentioned path and then in said first mentioned path an assembly comprising said first and second dies together with said second member coupled with said second die to align said first and second dies with and to locate them in closed position with respect to said fourth and fifth dies respectively, thereby defining a second pair of differing mold cavities with said second member located in (a) the cavity defined by the second and fifth dies and (b) the other of said second pair of mold cavities defined by said first and fourth dies,
   (E) into (a) injecting a heated thermoplastic material, which differs in color from said second member, to fill the unoccupied space of (a) and into contact with said second member to become coupled with said second member and to be molded in (a) thereby to provide a second unitary product, injecting a heated thermoplastic material into (b) for molding said material into a third molded member;
   (F) from said stationary dies moving an assembly comprising said first and second dies together with said third member coupled with said first die and said second unitary product coupled with said second die;
   (G) and removing said second unitary product from said second die.

4. The method defined in claim 3, said fourth die differing in configuration from both said third and fifth dies.

5. The method for injection molding multi-color products comprising
   (A) while a first die and a second die in straight line relationship are respectively in closed position with respect to a third die and a fourth die thereby to define a first pair of differing mold cavities, said third and fourth dies being in straight line relationship with respect to each other and to a fifth die, with said fourth die located between said third and fifth die, said first and second dies being movable and said third, fourth and fifth dies being stationary, and with a first molded thermoplastic member located in the cavity defined by said second die and said fourth die and partially filling the space thereof and corresponding substantially to a mold cavity defined by said second and fifth dies, when in closed position, and the other cavity defined by said first and third dies, into said cavity in which said member is located injecting a heated thermoplastic material, which is of a different color from said member, to fill the unoccupied space thereof and into contact with said member to become coupled with said member and to be molded therein to provide a multi-color molded unitary product, injecting a heated thermoplastic material into said other of said pair of mold cavities for molding said material in a second molded member;

(B) from said stationary dies moving in a straight line path to open position an assembly comprising said first and second dies, together with said second member coupled with said first die and said product coupled with said second die;

(C) removing said product from said second die;

(D) moving in a straight line path transversely of said first mentioned path and then in said first mentioned path an assembly comprising said first and second dies together with said second member coupled with said first die to align said first and second dies with and to locate them in closed position with respect to said fourth and fifth dies respectively, thereby defining a second pair of differing mold cavities, with said second member located in (a) the cavity defined by the first and fourth dies and (b) the other of said second pair of mold cavities defined by said second and fifth dies, (E) into (a) injecting a heated thermoplastic material, which differs in color from said second member, to fill the unoccupied space of (a) and into contact with said second member to become coupled with said second member and to be molded in (a) thereby to provide a second unitary product, injecting a heated thermoplastic material into (b) for molding said material into a third molded member;

(F) from said stationary dies moving an assembly comprising said first and second dies together with said third member coupled with said second die and said second unitary product coupled with said first die;

(G) and removing said second unitary product from said first die.

6. The method defined in claim 5, with said fourth die differing in configuration from both said third and fifth dies.

7. The method for producing a molded thermoplastic product comprising:

(a) pressure injecting heated thermoplastic material into a mold cavity defined when in closed position by one of two in-line dies and one of three in-line dies, one of said three in-line dies differing from another thereof, (b) from said three in-line dies to open position moving in a first path an assembly comprising both of said two in-line dies together with said material injected into and molded in said cavity and being coupled with said one of said two in-line dies, (c) while in said open position moving said assembly in one direction in a straight line path transversely of said first path to locate said one of said two in-line dies together with said material carried thereby in alignment with another of said three in-line dies and the other of said two in-line dies in alignment with still another of said three in-line dies, (d) then moving said assembly in said first mentioned path to closed position to define two differing mold cavities, one of said two mold cavities defined by said other of said two in-line dies and said still another of said three in-line dies and the other of said mold cavities defined by another of said three in-line dies and said one of said two in-line dies together with said molded material coupled therewith, (e) pressure injecting heated thermoplastic material into said two mold cavities, with the material injected into said other of said two cavities differing in color from that of said molded material, (f) from said three in-line dies to open position moving an assembly comprising both of said two in-line dies together with said material injected into and molded in said second defined cavity and coupled with said other of said two in-line dies, and a molded product carried by said one of said two in-line dies and formed by the molding and coupling of said material injected into said third defined cavity, (g) removing said product from said one of said two in-line dies, (h) while in said second mentioned open position moving in the aforesaid straight line path but in a direction opposite to said first mentioned direction said assembly to locate said one of said two in-line dies in alignment with said one of said three in-line dies and said another of said three in-line dies in alignment with the other of said two in-line dies together with the molded material coupled therewith, (i) then moving said assembly in said first mentioned path to closed position to define two differing mold cavities, one of said two mold cavities defined by said one of said two in-line dies and said one of said three in-line dies and the other of said mold cavities defined by said another of said three in-line dies and the other of said two in-line dies together with the molded material coupled therewith, and (j) injecting heated thermoplastic material into said last two mold cavities, with the thermoplastic material injected into said last defined mold cavity being different in color from said last mentioned molded material.

8. The method for producing a thermoplastic product comprising:

(a) pressure injecting heated thermoplastic material into a mold cavity defined when in closed position by one of two movable dies and one of three stationary dies, said one of said stationary dies differing from at least one of the other two thereof, (b) relative to said stationary dies moving in a path to open position a first assembly comprising both of said movable dies together with said material injected into and molded in said cavity and being coupled with said one of said movable dies, (c) moving said assembly in one direction in a straight-line path transversely of said first mentioned path to locate the dies thereof in alignment with a pair of said stationary dies exclusive of said one of said stationary dies, and then moving said assembly to closed position to define two mold cavities differing from each other, one of said two mold cavities defined by one of said pair of stationary dies and the second movable die and the other of said two mold cavities defined by another of said pair of stationary dies and said one of said movable dies together with said molded material coupled therewith (d) pressure injecting heated thermoplastic material of a color differing from that of said first mentioned thermoplastic material, into said other of said two mold cavities to mold and combine said last mentioned thermoplastic material with said first mentioned molded material thereby to provide a unitary product, with one portion thereof differing in color from another portion thereof, and pressure injecting heated thermoplastic material into said one of said two mold cavities, (e) from said stationary dies to open position moving a second assembly comprising both of said movable dies together with said unitary product coupled with said second movable die and with said material injected into and molded in said one of said two mold cavities and coupled with said one of said movable dies, (f) removing said unitary product therefrom, (g) in a direction opposite to said first mentioned direction and in said straight line path moving a third assembly comprising both of said movable dies together with said material injected into and molded in said last mentioned one of said two mold cavities and coupled with said second movable die to locate said movable dies in alignment with another pair of said stationary dies, with one of said pair being said first mentioned one of said stationary dies, (h) moving said third assembly relative to said stationary dies to closed position to define two mold cavities differing from each other, one of said last two mentioned mold cavities being defined by said one of said movable dies and said one of said stationary dies and the other of said last two mentioned cavities being defined by the third of said stationary dies and said second of said movable dies together with said molded material, coupled therewith, (i) pressure injecting heated thermoplastic material into said one of said last two defined mold cavities, pressure injecting heated thermoplastic material, differing in color from said last mentioned molded material, into said last defined mold cavity to mold said injected material and couple same with said last mentioned molded material thereby to provide a unitary product, with a portion thereof differing in color from another portion thereof, (j) from said stationary dies to open position, moving said movable dies together with said last mentioned unitary product, and said material injected into and molded in said one of said last mentioned mold cavities respectively coupled with said movable dies.

9. The method for injection molding multi-color products comprising:

(a) while two in-line movable dies are in closed position with respect to two of three in-line stationary dies thereby defining a first two differing mold cavities, with a first molded thermoplastic member located in one of said cavities and partially filling the space therein and corresponding substantially to a mold cavity defined by one of said movable dies and the other of said stationary dies when in closed position, into said cavity in which said first member is located, injecting a heated thermoplastic material, whose color differs from that of said member, to fill the unoccupied space thereof and into contact with said molded thermoplastic member to become coupled therewith and to be molded therein thereby to provide a multi-colored molded unitary product, and injecting a heated thermoplastic material into said other cavity for molding said material into a second molded member, (b) from said stationary dies moving in a first path to open position an assembly comprising said movable dies having said second molded element and said product respectively coupled with said movable dies, (c) removing said product from the die to which it is coupled, (d) in one direction and in a straight line path transversely of said first path and then in said first mentioned path, moving said movable dies together with said second member coupled to one of them to closed position with respect to one of said two of said three stationary dies and with respect to the third of said three stationary dies, thereby defining a second two differing mold cavities, with said second member located in one of said second two mold cavities and only partially filling the space therein, (e) into said cavity in which said second member is located injecting a heated thermoplastic material, whose color differs from that of said second member, to fill the unoccupied space thereof and into contact with said second member to become coupled therewith and to be molded therein thereby to provide a multi-color second unitary product, and injecting a heated thermoplastic material into said other of said second two cavities for molding said material into a third member, (f) from said stationary dies moving both of said movable dies together with said third member and said second unitary product respectively coupled therewith, and (g) removing said second unitary product from said die to which it is coupled.

10. An injection molding apparatus comprising a first set of dies comprising at least three dies in straight line relationship, and a second set of dies comprising at least two dies in straight line relationship, one of said dies of said first set differing from another thereof, first means for reciprocating one of said sets of dies in a predetermined straight line path to first locate said two dies of said second set in alignment with two of said three dies of said first set and then said two dies of said second set in alignment with two dies of said three dies of said first set, one of said last mentioned two of said three dies of said first set being other than said first mentioned two of said three dies, of said first set, second means for reciprocating one of said sets of dies with respect to the other set of dies to couple and uncouple said dies, when the dies thereof are in said aligned positions respectively, said aligned dies when coupled defining a plurality of sets of mold cavities, with one mold cavity of one set differing from the mold cavity of another set.

11. An injection molding apparatus comprising three transversely-stationary dies in straight line relationship, at least one of said dies differing in configuration from the other two thereof, two transversely-movable dies in straight line relationship, reciprocable means for moving said two transversely-movable dies in one direction in a predetermined straight line path to locate said two transversely-movable dies respectively in alignment with one of said other two of said three dies and with said one of said three dies differing in configuration from said other two thereof, and for moving said two transversely-movable dies in the opposite direction in said straight line path to locate said two transversely-movable dies respectively in alignment with the other of said other two of said three dies and with said one of said three dies differing in configuration from said other two thereof, reciprocable means for moving said dies in a path transversely of said first mentioned path to close and open said dies when in said respective alignments, when in closed respective positions said dies forming a set of mold cavities which differ from each other and then another set of mold cavities which differ from each other, and means communicating with said mold cavities for conducting moldable material under pressure into said mold cavities.

12. An injection molding apparatus comprising a first die carrying means, at least a first, second and third die cavity in straight line relationship and supported by said means one of said dies differing from at least one of the others, a second die carrying means, a pair of core dies in straight line relationship and supported by said second means, reciprocable means for moving said second means and said pair of dies carried thereby in one direction in a predetermined straight line path to locate said pair of core dies respectively in alignment with said first and second cavity dies and for moving said second means and said pair of core dies carried thereby in the opposite direction and in said path to locate said pair of core dies respectively in alignment with said second and third die cavities, reciprocable means for inserting said pair of core dies into said first and second die cavities when they are in alignment thereby to close said dies to define a pair of differing mold cavities and for removing said core dies therefrom, and for inserting said pair of core dies into said second and third die cavities when in alignment thereby to close said dies to define another pair of differing mold cavities and means communicating with said cavities for conducting moldable material into said cavities.

References Cited in the file of this patent

UNITED STATES PATENTS

| | | |
|---|---|---|
| 2,266,433 | Morin et al. | Dec. 16, 1941 |
| 2,333,059 | Tucker | Oct. 26, 1943 |
| 2,459,048 | Schwartz et al. | Jan. 11, 1949 |
| 2,510,091 | Dofsen et al. | June 6, 1950 |

FOREIGN PATENTS

| | | |
|---|---|---|
| 1,072,799 | Germany | Jan. 7, 1960 |